(12) United States Patent
Chapman et al.

(10) Patent No.: US 10,136,625 B2
(45) Date of Patent: Nov. 27, 2018

(54) ICE FISHING ROD WITH HEATING CONCENTRATED AT EYELETS

(71) Applicants: HUNT605 LLC, Rapid City, SD (US); CHAPSBUCK OUTDOORS LLC, Rapid City, SD (US)

(72) Inventors: Patrick Chapman, Rapid City, SD (US); Dale A. Lefebre, Rapid City, SD (US); David Fielding, Rapid City, SD (US)

(73) Assignees: HUNT605 LLC, Rapid City, SD (US); CHAPSBUCK OUTDOORS LLC, Rapid City, SD (US)

( * ) Notice: Subject to any disclaimer, the term of this patent is extended or adjusted under 35 U.S.C. 154(b) by 447 days.

(21) Appl. No.: 15/154,036

(22) Filed: May 13, 2016

(65) Prior Publication Data

US 2017/0325439 A1   Nov. 16, 2017

(51) Int. Cl.
| | |
|---|---|
| A01K 87/04 | (2006.01) |
| A01K 87/08 | (2006.01) |
| A01K 87/00 | (2006.01) |
| H02J 7/00 | (2006.01) |
| H05B 3/40 | (2006.01) |

(52) U.S. Cl.
CPC .......... *A01K 87/085* (2013.01); *A01K 87/007* (2013.01); *A01K 87/04* (2013.01); *H02J 7/0052* (2013.01); *H05B 3/40* (2013.01); *H02J 2007/0062* (2013.01); *H05B 2203/03* (2013.01)

(58) Field of Classification Search
CPC ...... A01K 87/00; A01K 87/007; A01K 87/04; A01K 87/08; A01K 87/085
USPC ................. 43/18.1 R, 18.5, 23, 24
See application file for complete search history.

(56) References Cited

U.S. PATENT DOCUMENTS

| | | | |
|---|---|---|---|
| 2,835,245 A | 5/1958 | Morgan | |
| 3,164,921 A | 1/1965 | Mavrakis | |
| 4,697,375 A * | 10/1987 | Mills | A01K 87/04 |
| | | | 43/17.5 |
| 5,175,953 A | 1/1993 | Lesnock | |
| 5,517,786 A | 5/1996 | Peissig | |
| 5,540,009 A | 6/1996 | Sykes | |
| 9,918,459 B2 * | 3/2018 | Laws | A01K 87/007 |
| 2005/0279010 A1 | 12/2005 | Krog | |
| 2006/0288629 A1 * | 12/2006 | Parker | A01K 87/007 |
| | | | 43/17.5 |

* cited by examiner

*Primary Examiner* — Lisa L Tsang
(74) *Attorney, Agent, or Firm* — Gordon Rees Scully Mansukhani LLP; David R. Heckadon

(57) ABSTRACT

A heated fishing rod that has a heating element disposed on the inside and outside of the rod that concentrates heating at the eyelets and at the distal end of the fishing rod.

21 Claims, 13 Drawing Sheets

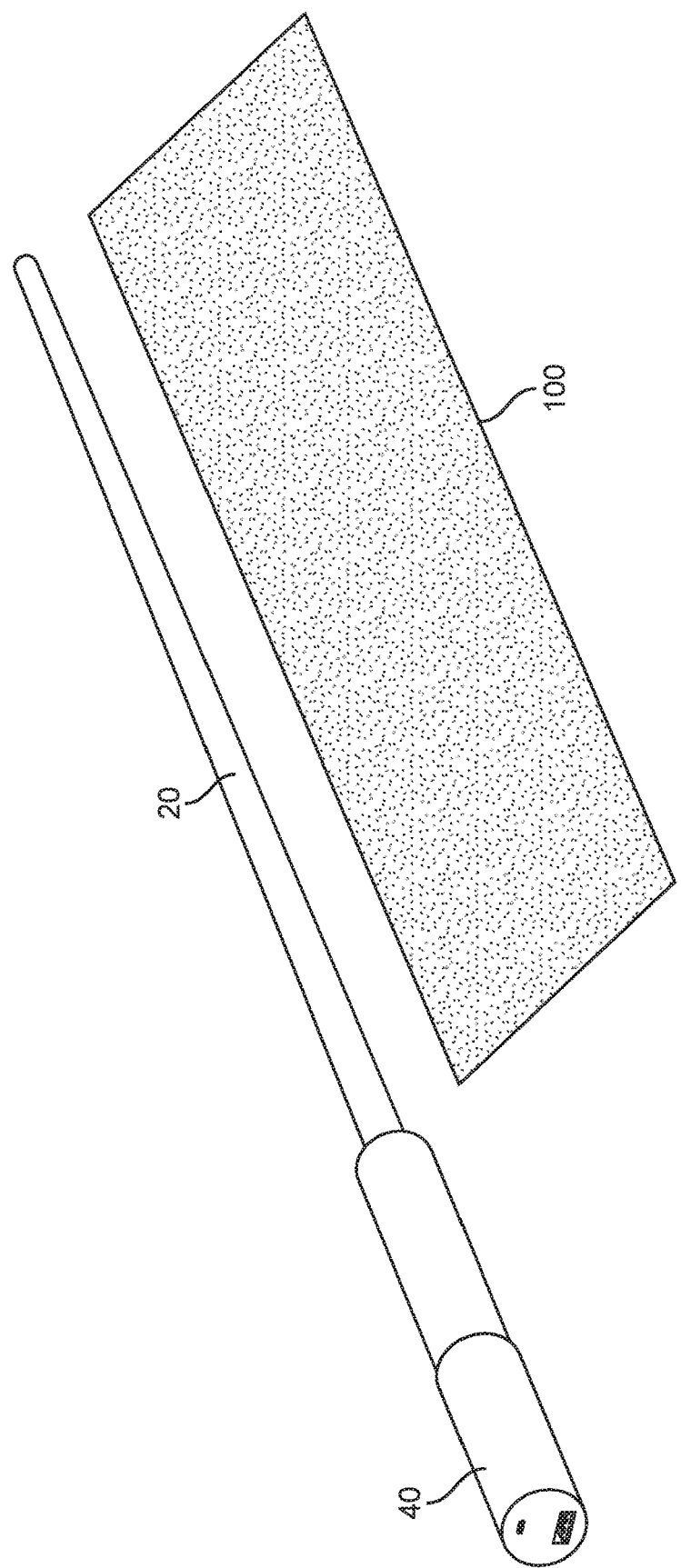

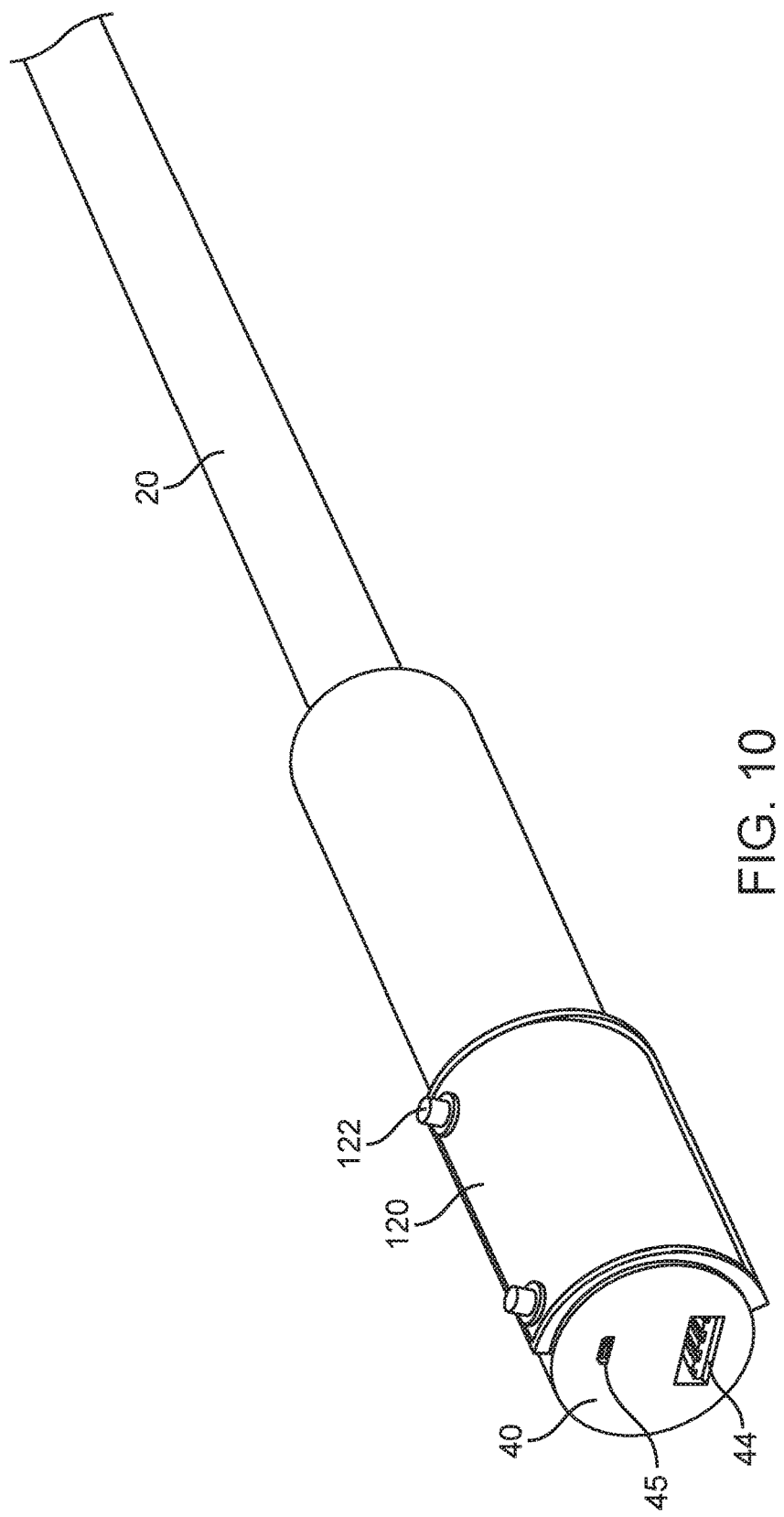

ICE FISHING ROD WITH HEATING CONCENTRATED AT EYELETS

TECHNICAL FIELD

The present invention relates to fishing rods used for ice fishing.

BACKGROUND OF THE INVENTION

Ice fishing presents unique challenges for the fisherman. One of the biggest challenges is the danger of the fishing line freezing to the line eyelets on the fishing rod. Additionally, the fishing line may also freeze to the body of the fishing rod itself. Several systems currently exist that either de-ice the eyelets of the fishing rod (to free the fishing line), or warm the handle of the fishing rod (to make the fishing rod more comfortable to hold). Unfortunately, systems that provide the optimal heat distribution to both the eyelets and the rod body itself have yet to be achieved.

What is instead desired is a system to warm both the eyelets and the rod itself to ensure that the fishing line does not freeze to the eyelets or to the fishing rod itself when ice fishing. Such a system would ideally concentrate the heating around the eyelets of the fishing rod, yet still provide some heating to the body of the fishing rod itself. Ideally, such a system would be quick to heat up so that it is ready for use in a short time.

Moreover, safety is always a concern with existing fishing rod heating systems. Therefore, an ideal heating system would also ensure that those parts of the fishing rod that are the hottest are also farthest away from the fisherman.

Existing heating systems use a considerable amount of energy to ensure that the eyelets remain warm. What would instead be desired is a specially designed heated eyelet that efficiently focusses the heat around the eyelet without wasting energy.

Existing fishing rod heating systems have additional problems. For example, they tend to involve a large number of parts, with a large number of separate heating elements. What is instead desired is a heating system that simply uses a fewer heating elements. Conceivably, an ideal system could use only one long continuous heating wire element.

SUMMARY OF THE INVENTION

The present invention provides a novel heated ice fishing rod having an optimized heating profile. In preferred aspects, the present system heats both the line eyelets of the rod and the main body of the fishing rod itself. However, the heating itself is more concentrated at the eyelets such that they are warmed to a greater degree than the body of the rod itself.

In preferred embodiments, the heating system uses a heating element that extends in a hollow bore through the center of the elongated body to a distal end of the elongated body, and then extends back along the exterior of the elongated body towards a proximal end of the elongated body. As such, the portion of the heating element that extends in a hollow bore through the center of the elongated body heats the elongated body from the inside out. Similarly, the portion of the heating element that extends back along the exterior of the elongated body simultaneously heats the elongated body from the outside in. An advantage of this approach of heating the fishing rod both from its interior and from its exterior is that it warms quickly, thereby making it available for immediate use.

Preferably, heating is more focused at the at least one eyelet than along the elongated body of the fishing rod such that the at least one eyelet reaches a higher temperature than the elongated body of the fishing rod.

Preferably as well, the elongated body tapers to a narrow distal end such that the heating element applies more heat at the distal end (i.e.: the end away from the handle) than at the proximal end (i.e.: the end close to the handle) such that the distal end of the elongated body reaches a higher temperature than the proximal end of the elongated body. This feature makes the fishing rod safe to use since the hottest portion of the rod is farthest away from the fisherman.

In preferred embodiments, the eyelet comprises a generally circular housing with a portion of the heating element (which is preferably a resistance wire) passing therearound. In some embodiments, the resistance wire passes around the inside of the housing once. In other embodiments, the resistance wire is wrapped several times around within the housing of the eyelet. In various approaches, the housing of the eyelet may be 3D printed, and the resistance wire may be inserted into a hollow chamber that wraps around the eyelet. In other approaches, the eyelet itself is 3D printed around the resistance wire such that the resistance wire is embedded within the eyelet.

The present system preferably includes a rechargeable battery with a USB/and or Micro USB port on the handle for plugging in and recharging the battery.

In other preferred aspects, the body of the fishing rod is itself 3D printed and may be 3D printed such that different sections of the rod have different stiffnesses (and thus flex to different amounts when in use). As such, the distal end of the rod can be printed to be more flexible than the proximal regions of the fishing rod. Optionally, the heating element may itself be 3D printed from powdered metal filaments into the body of the fishing rod itself.

In one optional embodiment, the heating system is simply one single resistance wire that extends along in a hollow bore through the center of the elongated body to warm the main body of the rod from the inside out. This same resistance wire can be wrapped around the exterior of the elongated body, optionally in a spiral pattern. As such, the same resistance wire provides both inwardly and outwardly directed heating to the body of the fishing rod.

In optional embodiments, the fishing rod may include a coating around the heating element on the exterior of the elongated body. This coating can distribute heat from the resistance wire to insulate the exterior of the rod along the length of its elongated body. In optional embodiments, the coating may be a carbon-fiber epoxy that is shrink wrapped around the exterior of the elongated body to cover the portion of the resistance wire that is wrapped around the exterior of the elongated body, and/or a water transfer printing hydrophobic sheet may be used.

BRIEF DESCRIPTION OF THE DRAWINGS

FIG. 9A shows the rod prior to transferring a coating using a water transfer printing hydrophobic sheet.

FIG. 10 illustrates an optional embodiment having an LCD display screen on the handle of the rod for displaying operating and surrounding conditions for the present system.

DETAILED DESCRIPTION OF THE DRAWINGS

Figure 1:
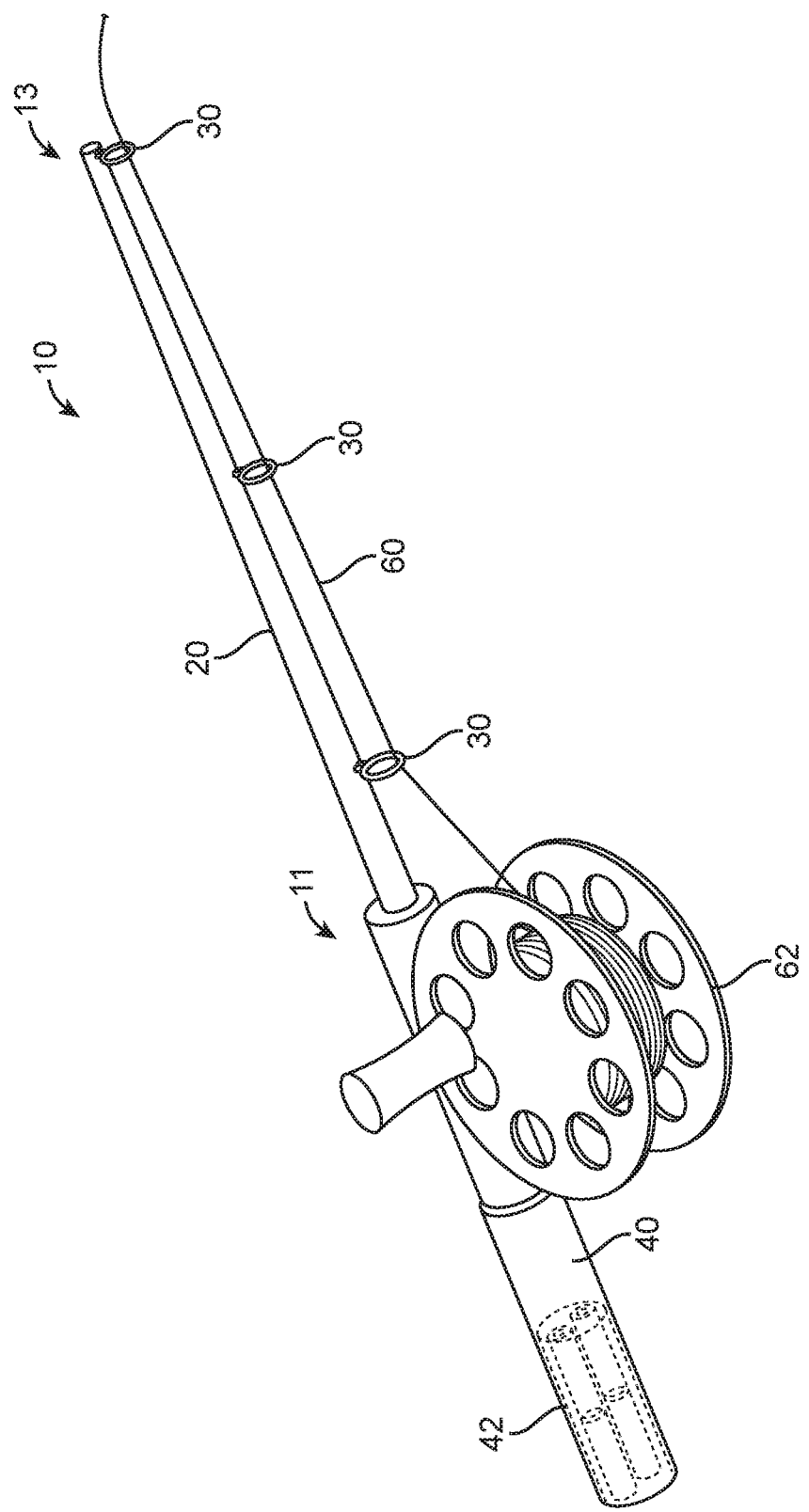
FIG. 1 is a perspective view of the present fishing rod.
Figure 2:
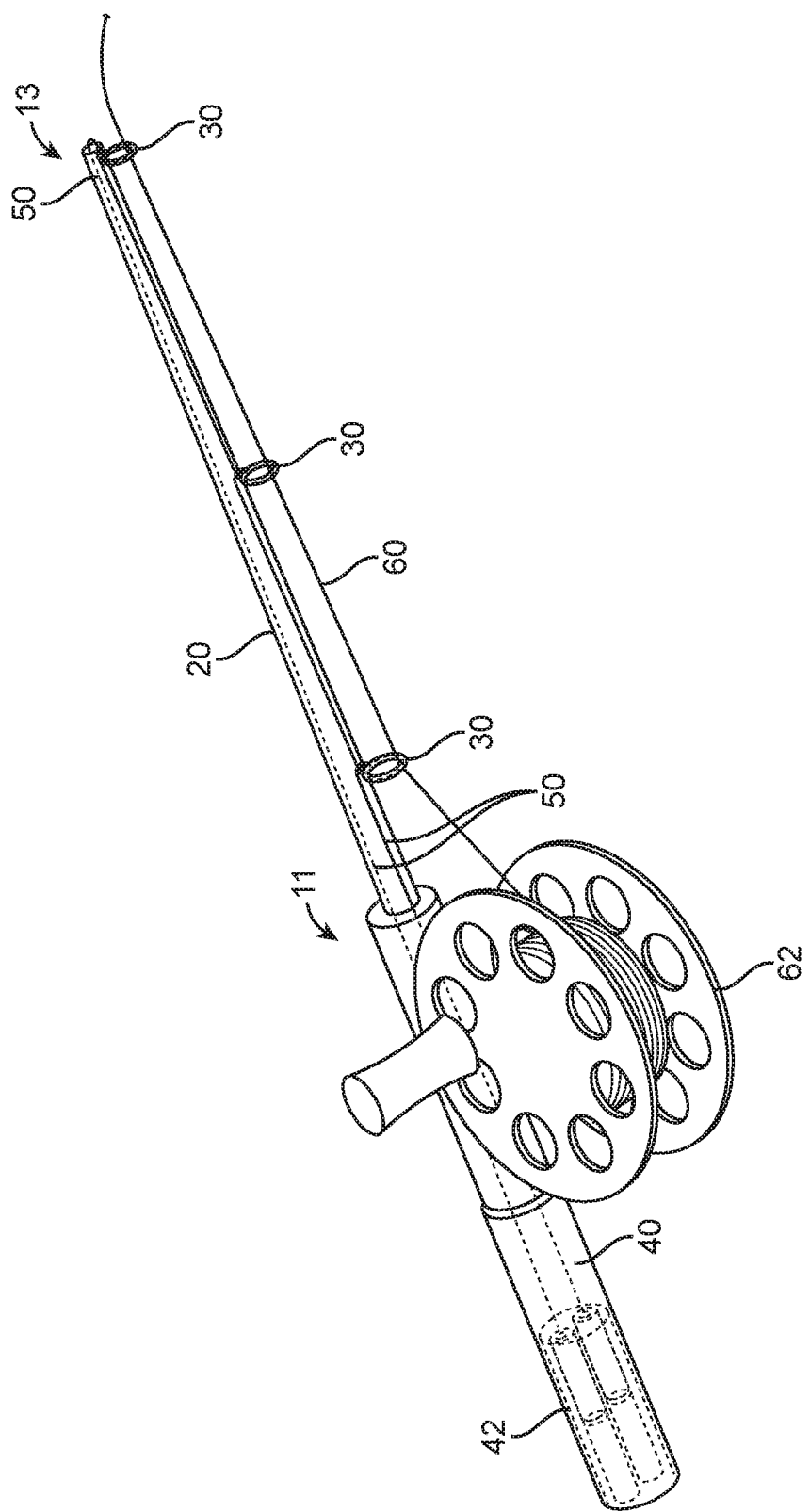
FIG. 2 is a perspective view showing internal features of the fishing rod.

FIGS. 1 and 2 show the present heated fishing rod 10, having a proximal end 11 and a distal end 13. Fishing rod 10 comprises an elongated body 20 with one or more eyelets 30 extending outwardly from the elongated body. A handle 40 is disposed at the proximal end 11, and a battery 42 is disposed within handle 40. A fishing line 60 and reel 62 are also shown.

The present invention provides a novel way to prevent fishing line 60 from freezing to any of eyelets 30 or to the body of elongated rod 20, as follows.

Figure 6:
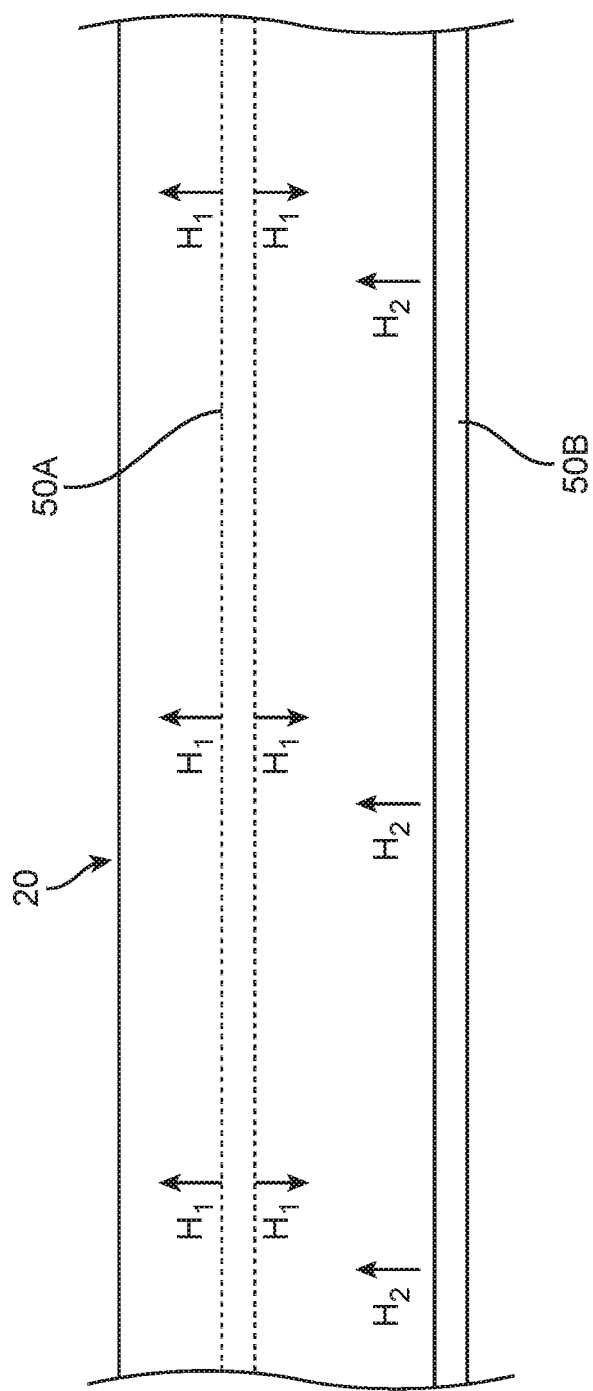
FIG. 6 is a sectional view of a portion of the elongated body of the fishing rod showing inwardly and outwardly heating.

A heating system or element 50 is in electrical contact with battery 42. As best seen in FIGS. 2 and 6, heating element 50 extends in a hollow bore through the center of elongated body 20 from near the handle 40 to distal end 11 of elongated body 20. In addition, heating element also extends back along the exterior of elongated body 20 towards proximal end 11 of elongated body 20. Thus, heating element 50 extends down the center of body 20 and also extends back along the outside of body 20. In some embodiments, heating element may be comprised of separate heating elements or wires connected together. In other embodiments, heating element 50 may be one continuous resistance wire.

Accordingly, as seen by arrows H in FIG. 6, when current from battery 42 passes through resistance wire 50, the portion of heating element 50A that extends in the hollow bore through the center of elongated body 20 heats elongated body 20 from the inside out, and similarly, the portion of heating element 50B that extends back along the exterior of elongated body 20 simultaneously heats elongated body 20 from the outside in.

Preferably, resistance wire 50 is made 80% from nickel and 20% from chromium. However, it is to be understood that other suitable materials may be used instead. Preferably, battery 42 applies a variable voltage, causing resistance wire 50 to reach a temperature of between 80 F. to 180 F.

Figure 4:
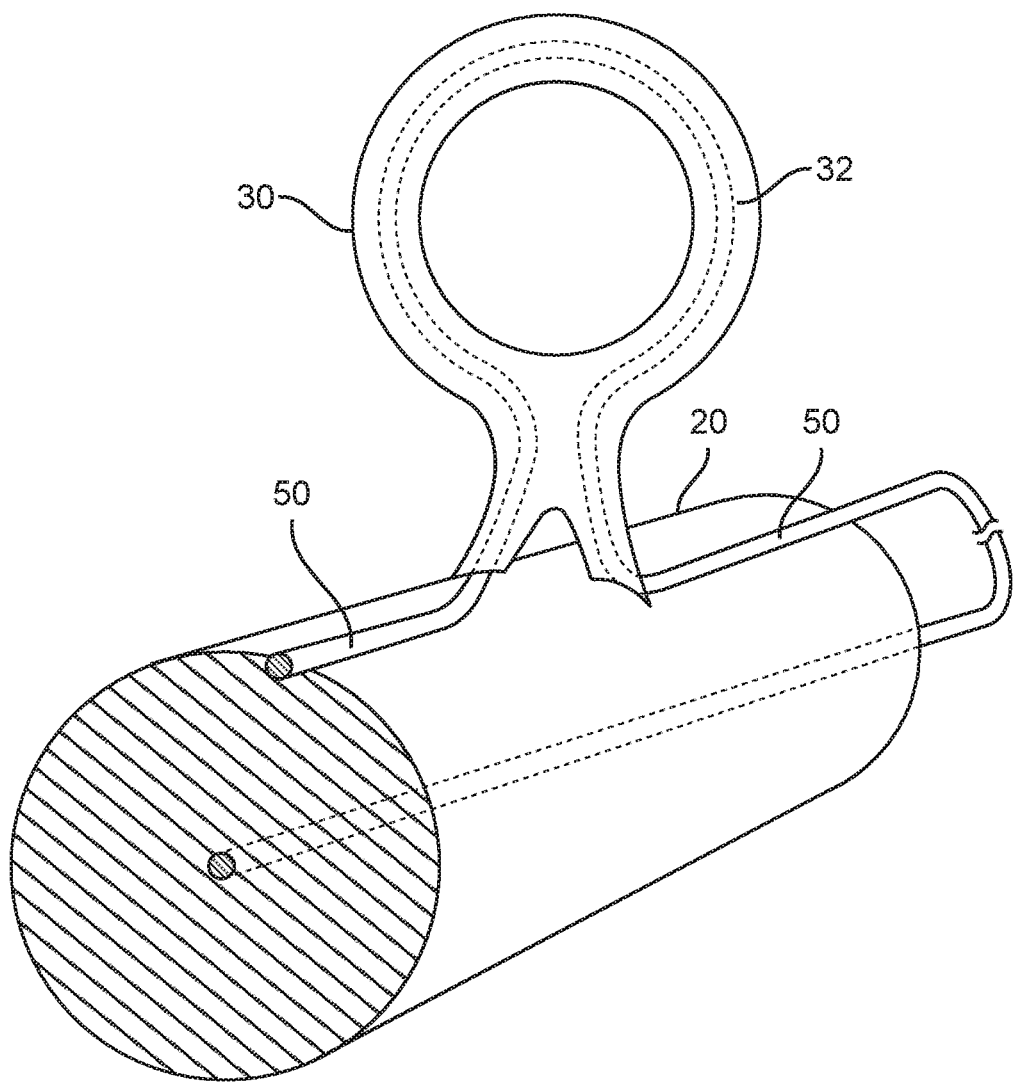
FIG. 4 is a close-up sectional view showing the region where the eyelet connects to the main body of the fishing rod.

As best seen in FIG. 4, resistance wire 50 also extends around eyelet 30 using one of several different approaches. In accordance with the present system, the heating is more focused at the eyelets 30 than along the elongated body 20 of the fishing rod. As a result, the eyelets 30 reach a higher temperature than the elongated body of the fishing rod. As will be explained, this can be achieved by increasing the wrapping density of heating wire 50 around eyelet 30 or by increasing the voltage from the battery 42 to resister wire 50 travelling through the interior of eyelet 30.

Preferably, as seen in FIGS. 1 and 2, elongated body 20 tapers from a wider proximal end 11 to a narrow distal end 13. As a result, heating element 50 applies more heat at distal end 13 as compared to proximal end 11. Therefore, distal end 13 will reach a higher temperature than proximal end 11 of the fishing rod. This has the advantage of keeping the hottest part of the fishing rod farthest from the fisherman/woman. This both keeps the fisherman/woman safe, and ensures that the region near the eyelet 30 at the distal end 13 does not freeze.

Figure 3A:
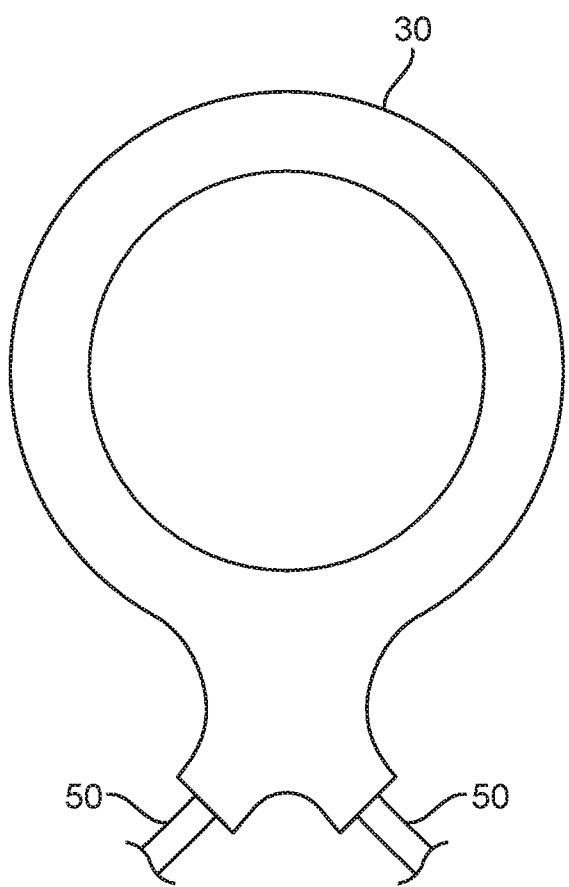
FIG. 3A is a close-up perspective view of a preferred eyelet.
Figure 3B:
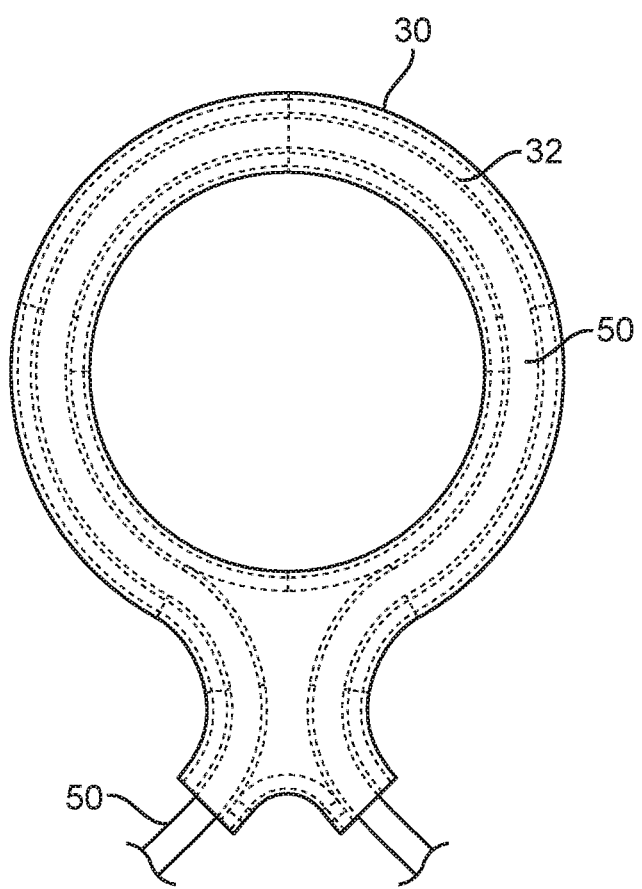
FIG. 3B is a sectional view corresponding to FIG. 3A.

As seen in FIGS. 3A and 3B, eyelet 30 preferably comprises a generally circular housing with a portion of the heating wire 50 passing therearound. In various approaches, resistance wire 50 may be disposed within inner chamber 32 and may either be wrapped once or many times around inner chamber 32 of eyelet 30.

Preferably, eyelet 30 is 3D printed with inner channel 32 therein. After eyelet 30 has been 3D printed, resistance wire 50 be inserted into inner channel 32. Alternatively, eyelet 30 may be 3D printed around heating wire 50 such that the heating element is embedded within the housing of eyelet 30. Preferably, the housing of eyelet 30 is made of a plastic filament with thermal conductivity greater than 100 k, where k=(Btu/(hr×degrees F.×ft)).

Preferably as well, elongated body 20 of the fishing rod can be made of fiberglass or graphene, acrylonitrile butadiene styrene, polylactic acid, thermal polyeurethane, or any combination of these materials. Alternatively, elongated body 20 may be 3D printed.

Figure 5:
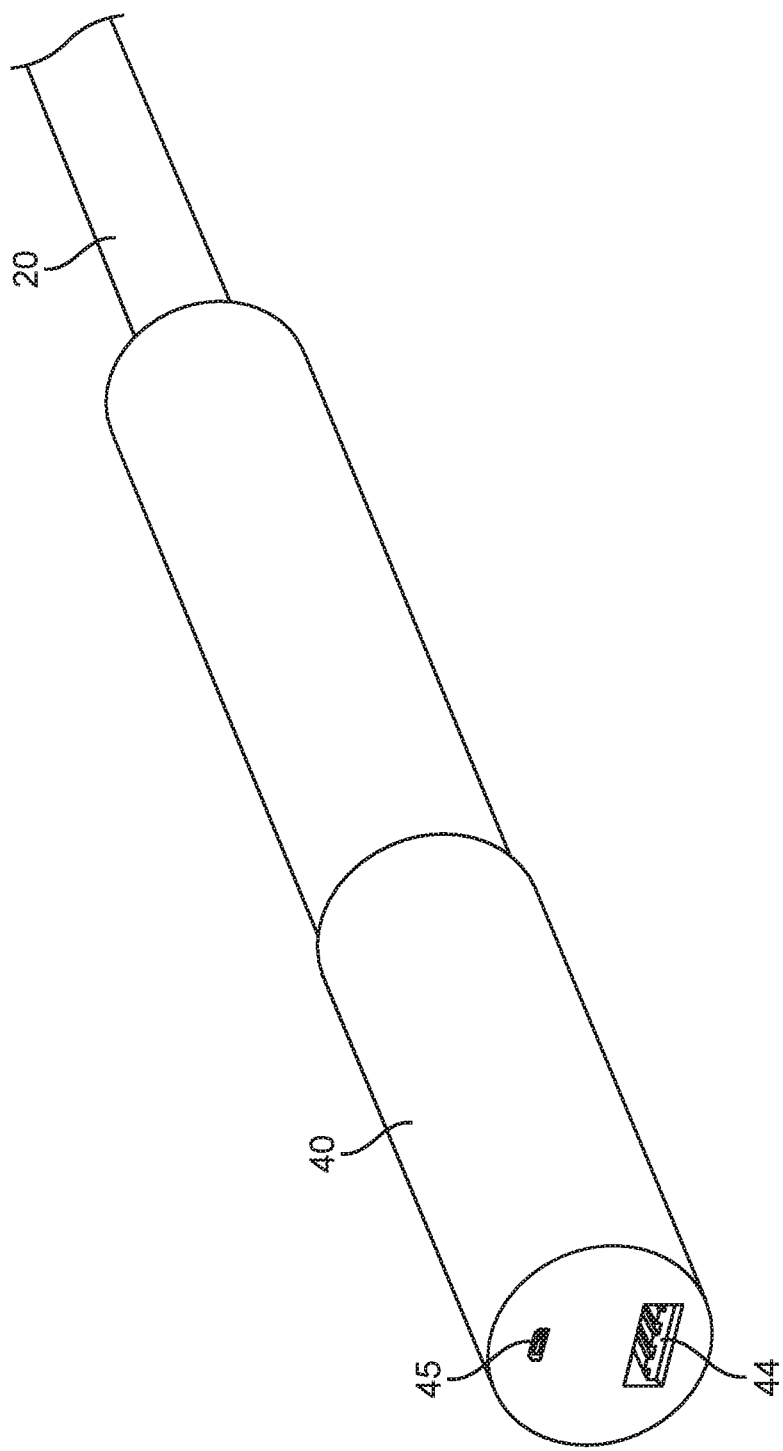
FIG. 5 is a close-up view of the handle region of the fishing rod.

As seen in FIG. 5, handle 40 includes battery 42 therein. Preferably, battery 42 is rechargeable, and can be recharged by connecting a power source to USB port 44 or Micro USB port 45.

In those embodiments of the invention where the body 20 of the fishing rod is 3D printed, different sections of the elongated body can be 3D printed to have different stiffnesses. As a result, these different sections can be made to have different flexibilities, such that sections near distal end 13 are more flexible.

Also, in those embodiments of the invention where the body 20 of the fishing rod is 3D printed, the eyelet 30 can be formed from powdered metal filaments that are 3D printed into and onto the 3D printed elongated body. Examples of powdered metal filaments include copper, bronze and steel.

Figure 7A:
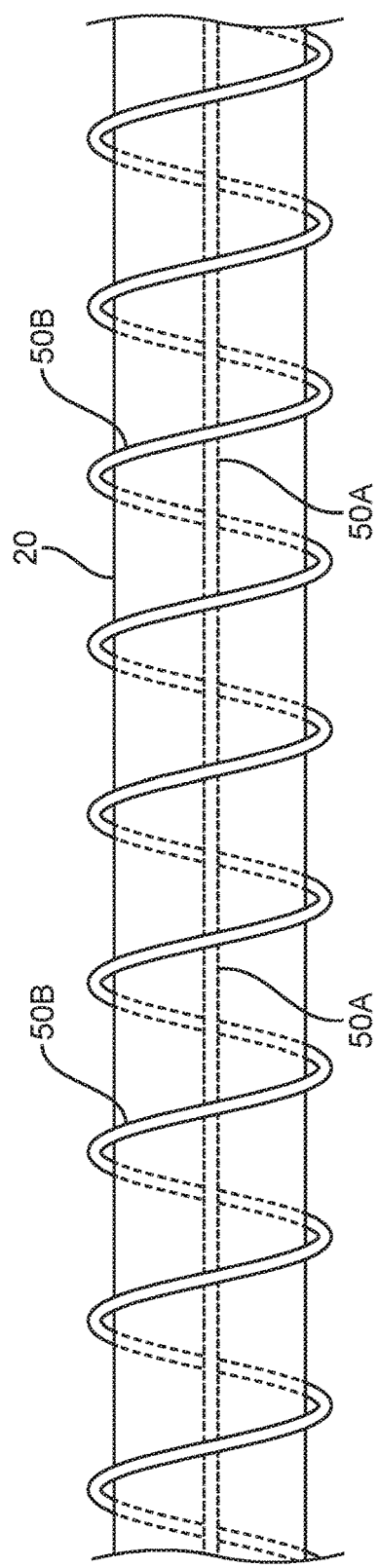
FIG. 7A is a side elevation view of an embodiment of the invention in which a portion of the resistance wire is spiraled around the outer surface of the elongated body of the fishing rod.
Figure 7B:
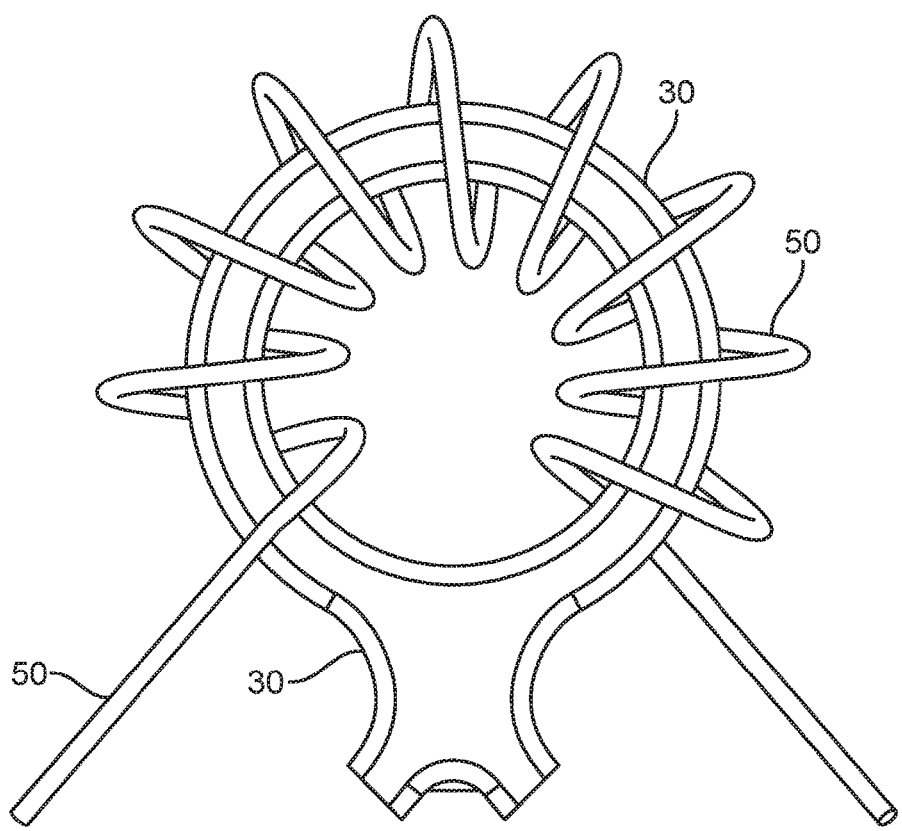
FIG. 7B is a perspective view an embodiment of the invention in which the resistance wire wrapped around one of the eyelets.

In one optional embodiment of the invention illustrated in FIGS. 7A and 7B, the heating element 50 is one single continuous resistance wire having a first portion 50A that extends down the center of the elongated body 20 and a second portion 50B that extends back along the exterior of elongated body 20. As seen in FIG. 7A, portion 50B wraps around the elongated body in a spiral pattern. This same continuous wire can also have a third portion that is wrapped around eyelet 30 as seen in FIG. 7B. In accordance with one aspect of the invention, the amount of heating applied at the eyelets 30 (FIG. 7B) can be higher than the amount of heating applied along body 20 (FIG. 7A). This result can optionally be achieved by having a higher wrapping density of resistance wire 50 around the eyelet 30 than around the exterior of elongated body 20. (As understood herein, wrapping density may be understood to mean the number of wraps of resistance wire per square inch).

Figure 8:
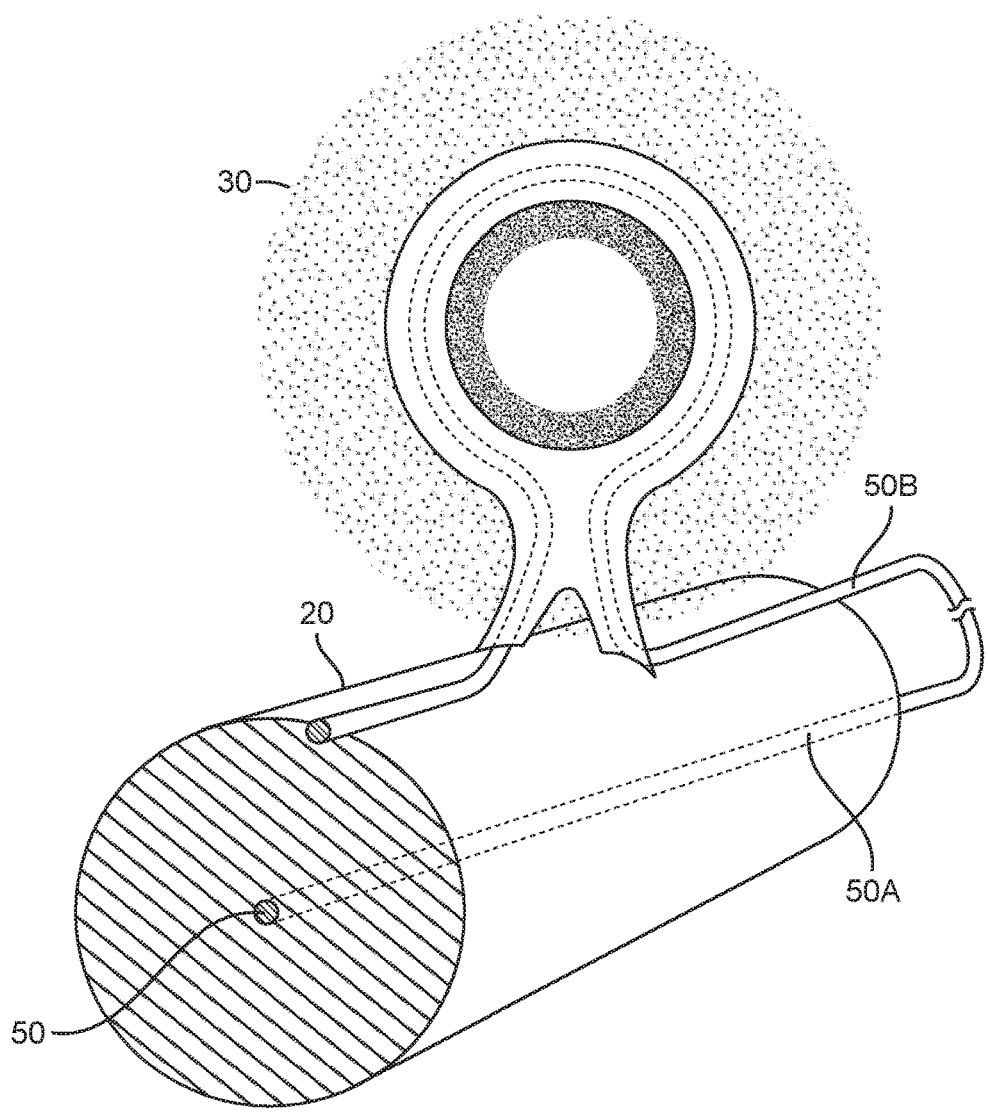
FIG. 8 illustrates the heating profile around the eyelet.

FIG. 8 illustrates that the hottest regions of the present system are within eyelet 30 since the heat from resistance wire 50 is focused at this location. The added darkening of the illustration immediately adjacent to eyelet 30 shows the area where heating is greatest and temperatures are highest.

Figure 9B:
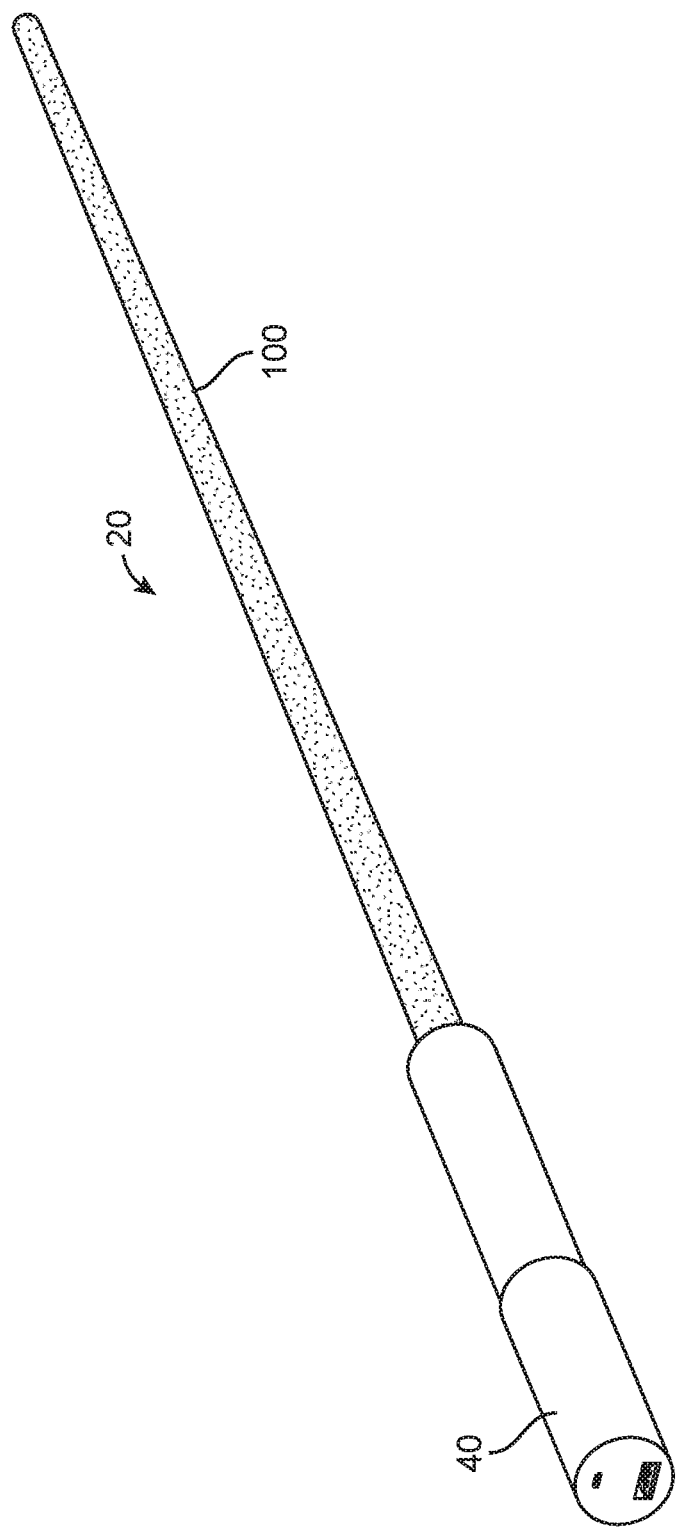
FIG. 9B corresponds to FIG. 9A, but after the water transfer printing hydrophobic sheet coating has been transferred to the rod.

In other optional aspects, the present fishing rod 10 further comprises a coating around the portion of heating element 50B that extends back along the exterior of elongated body 20. Thus, the coating may operate to distribute heat from resistance element 50 to insulate the exterior of the elongated body 20. Optionally, the coating can comprise a carbon-fiber epoxy. In an alternate embodiment of the invention in FIGS. 9A and 9B, a water transfer printing hydrophobic sheet 100 may be used. Specifically, rod 20 is simply dipped into hydrophobic sheet 100 in FIG. 9A such that the coating on hydrophobic sheet 100 is transferred to the exterior of rod 20 as seen in FIG. 9B.

Lastly, FIG. 10 shows the optional embodiment of the invention in which a display screen 120 displays either ambient conditions or operating conditions of the device, or both. For example, display 120 may interact with sensors on the fishing rod to show ambient temperature, atmospheric pressure, weather conditions, battery life, the temperature of rod 20 or eyelets 30, etc. In further optional embodiments, pressure sensors 122 may be included to determine if the 40 handle of the rod 20 is underwater. Should this occur, the system could use a Bluetooth connection to send a distress signal to other smartphones that are in the vicinity that are also connected via Bluetooth. Data and media transfer could also be provided by way of USB ports 44 and 45 to a microcomputer in handle 40.

What is claimed is:

1. A heated ice fishing rod, comprising:
   (a) an elongated body;
   (b) at least one eyelet extending outwardly from the elongated body;
   (c) a handle at one end of the elongated body;
   (d) a battery in the handle;
   (e) a heating element in electrical contact with the battery, wherein the heating element extends in a hollow bore through a center of the elongated body to a distal end of the elongated body, and extends back along an entire length of an exterior of the elongated body towards a proximal end of the elongated body, and extends around the at least one eyelet.

2. The heated fishing rod of claim 1, wherein,
   a portion of the heating element that extends in the hollow bore through the center of the elongated body heats the elongated body from the inside out, and wherein
   a portion of the heating element that extends back along the exterior of the elongated body simultaneously heats the elongated body from the outside in.

3. The heated fishing rod of claim 1, wherein heating is more focused at the at least one eyelet than along the elongated body of the fishing rod such that the at least one eyelet reaches a higher temperature than the elongated body of the fishing rod.

4. The heated fishing rod of claim 1, wherein the elongated body tapers to the distal end which is narrow such that the heating element applies more heat at the distal end of the elongated body than at the proximal end of the elongated body such that the distal end of the elongated body reaches a higher temperature than the proximal end of the elongated body.

5. The heated fishing rod of claim 1, wherein the at least one eyelet comprises a generally circular housing with a portion of the heating element passing therearound.

6. The heated fishing rod of claim 5, wherein the portion of the heating element passing around the housing is a single resistance wire.

7. The heated fishing rod of claim 6, wherein the single resistance wire passes around the housing multiple times.

8. The heated fishing rod of claim 5, wherein the at least one eyelet is three dimensional(3D) printed and has a single continuous chamber extending therearound, and wherein the heating element passes through the single continuous chamber.

9. The heated fishing rod of claim 5, wherein the at least one eyelet is 3D printed around the heating element such that the heating element is embedded within the housing of the at least one eyelet.

10. The heated fishing rod of claim 5, wherein the housing is made of copper, bronze or steel.

11. The heated fishing rod of claim 1, wherein the elongated body of the fishing rod is made of fiberglass, graphene, acrylonitrile butadiene styrene, polylactic acid, or thermal polyeurethane.

12. The heated fishing rod of claim 1, wherein the battery is rechargeable.

13. The heated fishing rod of claim 12, further comprising a Universal Serial Bus (USB) or micro-USB port on the handle for recharging the battery.

14. The heated fishing rod of claim 1, wherein the elongated body is 3D printed, and wherein different sections of the elongated body are 3D printed with different stiffnesses.

15. The heated fishing rod of claim 14, wherein the heating element is formed from powdered metal filaments that are 3D printed into and onto the 3D printed elongated body.

16. The heated fishing rod of claim 1, wherein the heating element is a single continuous resistance wire.

17. The heated fishing rod of claim 1, wherein a portion of the heating element that extends back along the exterior of the elongated body wraps around the elongated body in a spiral pattern.

18. The heated fishing rod of claim 17, wherein the heating element has a higher wrapping density around the at least one eyelet than around the exterior of the elongated body.

19. The heated fishing rod of claim 1, further comprising:
   (f) a coating around the heating element extending back along the exterior of the elongated body, wherein the coating distributes heat from the heating element to insulate the exterior of the elongated body.

20. The heated fishing rod of claim 19, wherein the coating is a carbon-fiber epoxy or material transferred by a water transfer printing hydrophobic sheet.

21. The heated fishing rod of claim 1, further comprising:
   (f) a visual display of ambient or operating conditions on the handle.

* * * * *